Figure 1:
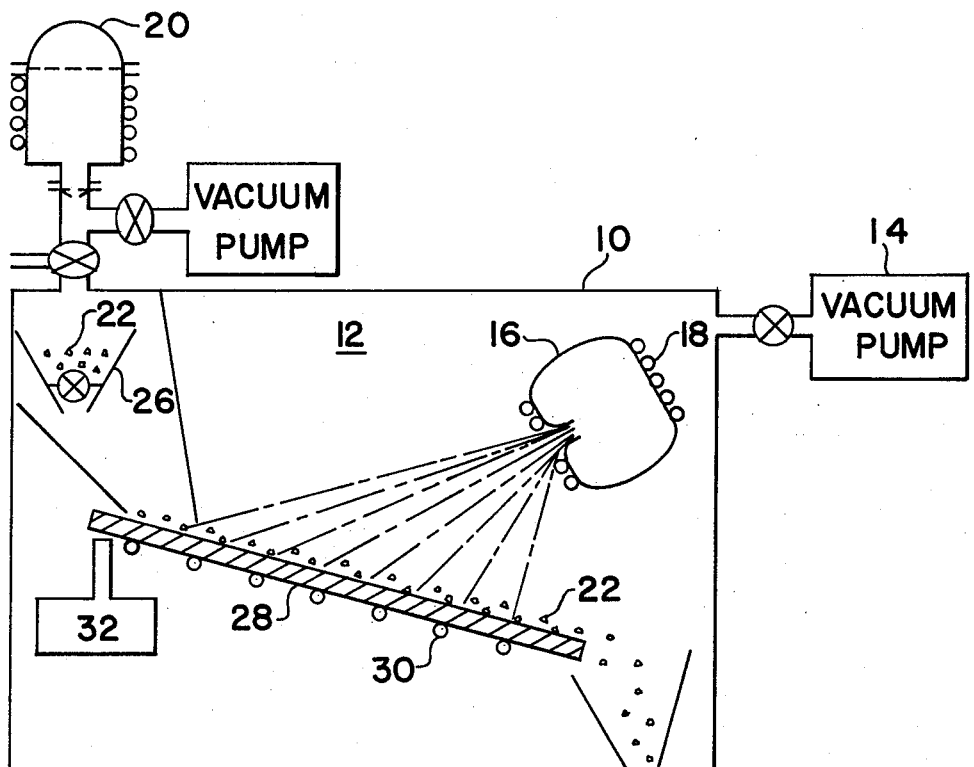

INVENTORS
John Z. Cerych
BY Allen L. Klivanoff
Oliver W. Hayes
Edward A. Gordon 3,192,064
COATING
John Z. Cerych, Methuen, and Allen L. Klibanoff, Boston, Mass., assignors, by mesne assignments, to National Research Corporation, Cambridge, Mass., a corporation of Massachusetts
Filed Nov. 22, 1961, Ser. No. 154,139
5 Claims. (Cl. 117—100)

The present invention relates to a coating method and the product resulting therefrom, and more particularly, to a novel method of encapsulating articles with black adherent metallic coatings.

In a number of fields, and particularly in the field of graphic art, it is desirable to prepare particles with a black coating which is capable of accepting or conducting an electric charge or which is magnetic. Particles encapsulated with such coatings are well adapted for use as conductive or magnetic inks in electroprinting.

In electrostatic recorders, thermoplastic particles encapsulated with a black metallic coating can be used as the printing ink. For example, areas of the surface of special recorder paper are electrostatically charged in the shape of letters by the recorder and then the recorder paper is developed by passing it through the ink which consists of fine particles of a thermoplastic encapsulated with a black metallic coating. By charging the encapsulated particles with a charge opposite to that of the recorder paper the particles adhere to the charged sections of the recorder paper. Permanent adhesion to the recorder paper is accomplished by the application of heat and/or pressure. Magnetic inks would be prepared and utilized in a similar fashion.

Particles encapsulated with such coatings are also well adapted for use as calibration standards in particle size determinations. For example, glass beads of various particle sizes encapsulated with black metallic coatings may be mixed with a suitable liquid carrier and then passed through photoelectric measuring means and calibration curves determined therefrom.

In providing small particles of this nature with black coatings which are electrically sensitive and/or magnetic, problems have been encountered in the past. For example, coatings prepared from plating baths require fairly complicated application procedures and may be applied only to certain surfaces. Additionally, some coatings require heat treatment at elevated temperatures and hence cannot be applied to heat sensitive substrates.

Accordingly, a principal object of the present invention is to provide a method of encapsulating articles with black adherent metallic coatings.

Another object of this invention is to provide black metallic coating which may be applied on metallic and non-metallic articles.

Still another object of the present invention is to provide a pressure and heat sensitive thermoplastic particle with an adherent black metallic coating.

A further object of the present invention is to provide black metallic coatings which are electrically sensitive and/or magnetic.

A still further object of the present invention is to provide a high surface area metallic coating which absorbs by internal reflection visible light so as to appear black.

Other objects of the invention will in part be obvious and will in part appear hereinafter.

The invention accordingly comprises the product possessing the features, properties and the relation of components and the process involving the several steps and the relation and the order of one or more of such steps with respect to each of the others which are exemplified in the following detailed description and the scope of the application of which is indicated in the claims.

Figure 2:

For a fuller understanding of the nature and objects of the invention reference should be had to the following detailed description taken in connection with the accompanying drawing wherein FIG. 1 is a diagrammatic, schematic view of one preferred apparatus for practicing the invention and wherein FIG. 2 is a schematic view of a substrate particle coated in accord with the invention.

Broadly stated, the present invention comprises thermally evaporating a metal in a vacuum chamber and then condensing and collecting the metal vapors on a substrate to be coated as a fine powder to provide a porous layer of fine metal particles having an extremely high surface area. The condensed metal particles forming the layer are sufficiently small so that the layer substantially completely absorbs incident light by internal reflection and appears black.

In accordance with the present invention, the thermal energy of metal vapors is sufficiently reduced so that the metal vapors condense as an ultra fine metal powder on the substrate to be coated. The residual energy of the metal condensate must be sufficiently low so as to prevent substantial crystal growth above about 500 angstroms and formation of a continuous film but sufficiently high to provide sufficient agglomeration of the resultant fine metal powder particles to form an adherent porous layer of metal powder particles.

In accordance with the present invention, it was discovered that the energy of the metal vapors can be controlled (and hence the nature of the coating obtained) by controlling the inert gas pressure at which evaporation and condensation of the metal takes place for a given vapor source to substrate distance.

By increasing the inert gas pressure sufficiently above the pressure normally used for vacuum coating operation, the metal vapors condense as a fine powder to form a porous, high-surface-area coating of low reflectivity rather than a continuous, low-surface-area reflective coating obtained at lower pressures.

The mechanism by which the energy of the metal vapors is reduced occurs in the following manner. When the inert gas pressure is increased the metal atoms lose more energy through increased collisions with the inert gas molecules. The result is that the metal condensate upon reaching the substrate surface has less residual energy to provide adequate mobility for larger crystal growth.

Additionally, by maintaining the substrate at a sufficiently low temperature the energy of the condensed phase is further reduced and hence larger crystal growth further is inhibited. Thus, by cooling the substrate, the surface of the substrate is provided with an accommodation coefficient approaching unity. The term "accommodation coefficient" is defined as the ratio between the number of molecules which actually condense on the surface of the substrate and the number of molecules which strike the surface. Thus the accommodation coefficient is primarily a function of the temperature of the substrate and the concentration of the incident molecules at the substrate surface (i.e. the rate of evaporation). Thus, by drastically reducing the energy of the condensed phase and hence its mobility a very fine powder results to form a porous, high surface area, low reflective coating.

In the production of such black metallic coatings, it is apparent then that the thermal energy of the metal which impinges on the substrate to be coated will be a function of the evaporation temperature, of the inert gas pressure through which the metal vapors pass, and of the vapor source to substrate distance. These conditions are interrelated. Thus, at one evaporation temperature, for example, at greater vapor source to substrate distances, lower inert gas pressures may be employed. In general for a given evaporation temperature and vapor source to substrate distance, the residual thermal energy of the metal condensate will be a function of the inert gas pressure.

In one preferred embodiment of the present invention wherein black aluminum coatings are produced the aluminum vapor source is preferably positioned approximately 12 to 20 inches from the substrate to be coated. The vacuum chamber is preferably evacuated to a pressure on the order of 0.1 micron Hg abs. to remove residual gases and then back filled with an inert gas such as argon to the desired operating pressure. The inert gas pressure is maintained below 180 microns and preferably between about 25 and 45 microns Hg abs. The substrate to be coated is preferably maintained at a temperature of less than about 70° C. and at least below its melting point. The vaporization of the aluminum metal is preferably carried out at temperature of about 1200° to 1400° C. In this manner a porous, high surface area coating of aluminum metal is formed which substantially completely absorbs incident light by internal reflection and appears black.

Referring now to the drawing there is shown one preferred type of apparatus for carrying out the present invention. In the drawing 10 represents a vacuum tight housing defining a vacuum chamber 12 arranged to be evacuated by a vacuum pump system schematically indicated at 14. Means for holding the metal to be vaporized and condensed is schematically indicated as crucible 16. The crucible is preferably heated by induction coils 18. A means 20 is provided for introducing a particulate substrate 22 into the vacuum chamber. Means 20 is preferably provided with cooling coils 24 for precooling the substrate 22. A supply of the particulate substrate 22 is received by a storage bin generally represented at 26. The individual substrate particles are advanced through the coating vapors by means 28 represented as a vibratory platform. The platform and thus the substrate is preferably cooled by cooling coils 30. The operation of the platform is controlled by a variable speed motor 32 and the encapsulated substrate is received by means 34 which is preferably cooled by cooling coils 36.

The invention will now be described by way of the following non-limiting examples.

*Example 1*

Aluminum was placed in the crucible 16 and the tank 10 was closed and evacuated to a pressure on the order of 0.1 micron Hg abs. to remove most of the residual gases. During the evacuation the induction heating coils 18 were energized and the aluminum brought up to melting temperature. During this period the pressure was increased by bleeding in argon from an inert gas source (not shown). When the desired pressure of about 25 to 60 microns Hg abs. was attained, the aluminum melt temperature was raised to about 1350° to 1400° C. so as to cause evaporation of the aluminum. At the same time a charge of polystyrene spheres having a particle size of about 44 to 105 microns were cooled to a temperature of about −50° to −70° C. and then introduced into the chamber and positioned on the vibratory platform. The vapor source to substrate distance was 16 inches. As vaporization of the aluminum took place the vapors were directed onto the polystyrene spheres. The vibratory platform caused the polystyrene spheres to tumble and advance thereby exposing all of the surface to the aluminum vapors which passed downwardly through the atmosphere of argon and collected on the spheres in the form of fine particles. The cooling coils of the vibratory platform maintained the polystyrene spheres at a temperature of about −60° to +50° C. during the coating operation. Upon completion of the operation the product consisted of polystyrene spheres having a black porous coating of aluminum. The surface area of the coating as measured by nitrogen adsorption was about 61 to 77 square meters per gram of aluminum.

*Example 2*

This example was similar to Example 1 in all respects except that the substrate consisted of glass spheres having a diameter of about 30 microns. Upon completion of the operation the product consisted of glass spheres coated a black porous coating of aluminum.

Since certain changes can be made in the above process and apparatus without departing from the scope of the invention herein involved, it is intended that all matter contained in the above description or shown in the accompanying drawing shall be interpreted as illustrative and not in a limiting sense.

What is claimed is:

1. An electroprinting ink comprising polystyrene particles with a porous coating of a conductive metal over the particles and wherein the metal coating is sufficiently porous to absorb incident light and appear black.

2. The ink of claim 1 wherein the metal is aluminum.

3. The coated polystyrene particles of claim 2 wherein the metal coating comprises agglomerated aluminum particles, which aluminum particles have a particle size of less than about 500 angstroms.

4. The coated polystyrene particles of claim 2 wherein the coating is sufficiently porous so that it has a surface area of 61–77 meters per gram of aluminum.

5. The coated polystyrene particles of claim 1 wherein the polystyrene particles are in the form of spheres having a particle size of about 44–105 microns.

References Cited by the Examiner

UNITED STATES PATENTS

| | | | |
|---|---|---|---|
| 2,398,517 | 4/46 | Castor | 118—49 |
| 2,846,971 | 8/58 | Baer et al. | 118—49 |
| 2,939,804 | 6/60 | Schossberger et al. | 117—100 |
| 3,003,975 | 10/61 | Louis | 252—514 X |

OTHER REFERENCES

Holland: Vaccum Deposition of Thin Films, John Wiley and Sons, New York, N.Y., 1956, TS 695.H6, pp. 199–203 and 210–212 relied on.

RICHARD D. NEVIUS, *Primary Examiner.*